Figure 1:
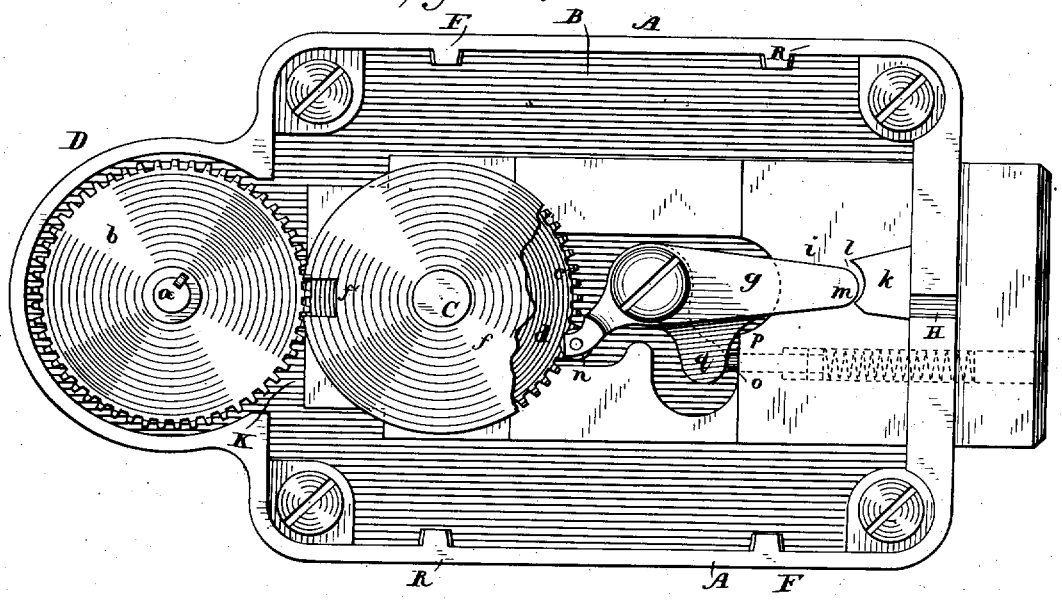

3 Sheets—Sheet 1.

E. STOCKWELL.

Assignor to THE YALE & TOWNE MANUFACTURING COMPANY.

PERMUTATION LOCK.

No. 10,518. Reissued Aug. 26, 1884.

WITNESSES

Ed. C. Newman,

Al. C. Newman.

INVENTOR

*Emory Stockwell*

*By his Attorneys*

Baldwin, Hopkins & Peyton.

E. STOCKWELL.

Assignor to THE YALE & TOWNE MANUFACTURING COMPANY.

PERMUTATION LOCK.

No. 10,518. Reissued Aug. 26, 1884.

WITNESSES

Ed. A. Newman.

Al. C. Newman.

INVENTOR

*Emory Stockwell.*

*By his Attorneys*

Baldwin, Hopkins & Peyton.

3 Sheets—Sheet 3.

E. STOCKWELL.

Assignor to THE YALE & TOWNE MANUFACTURING COMPANY.

PERMUTATION LOCK.

No. 10,518. Reissued Aug. 26, 1884.

WITNESSES

Ed. A. Newman,

Ed. C. Newman.

INVENTOR

Emory Stockwell

By his Attorneys

Baldwin, Hopkins & Peyton.

UNITED STATES PATENT OFFICE.

EMORY STOCKWELL, OF STAMFORD, CONNECTICUT, ASSIGNOR TO THE YALE & TOWNE MANUFACTURING COMPANY, OF SAME PLACE.

PERMUTATION-LOCK.

SPECIFICATION forming part of Reissued Letters Patent No. 10,518, dated August 26, 1884.

Original No. 299,695, dated June 3, 1884. Application for reissue filed June 27, 1884.

*To all whom it may concern:*

Be it known that I, EMORY STOCKWELL, of Stamford, in the county of Fairfield and State of Connecticut, have invented certain new and useful Improvements in Dial or Combination Locks, of which the following is a specification, reference being had to the accompanying drawings.

Heretofore the covers of dial-locks or their tumbler-curbs have been held in place usually by a screw, but in some cases also by supplementary locks. If any dishonest person desired to learn the combination, he had merely to gain access to the lock to unscrew the cover or the tumbler-curb, and he might then learn the combination and effect an entrance to the safe, or, in the case of a supplementary lock, to gain the same information by obtaining possession of the key of the supplementary lock. To obviate this defect I so construct the cover of my lock that it will be locked in place by means of the combination-wheels themselves. It will then be impossible for any one to remove the cover who does not know the proper combination for unlocking the lock when the door is locked. This knowledge being presumably only in possession of the person authorized to open the lock, my device will be a perfect protection against the dangers above referred to.

I prefer to make the dog which prevents the bolt from being retracted, and the fence which drops into notches in the tumblers and cam when the combination is set up, all in one piece; and, further, this piece is so constructed that, should pressure be applied to the end of the bolt in the endeavor to pick the lock, pressure of the fence would be immediately removed from the faces of the tumblers. Pressure of the fence upon the tumblers being almost an essential to picking the lock, this provision in my lock renders it secure against this mode of attack; but this provision I do not claim to be new.

Another improvement is in the mode of fastening the tumbler-curb in place. I do this by means of a fixed stump attached to the lock-case, on which stump the cam for operating the tumblers and bolt revolves. The tumbler-curb is then screwed down on the stump, and is held from unscrewing by engagement with a rib on the back of the lock-case. This construction effects several good results: First, it enables the lock to be made with an outside shaft, which is connected by proper gearing with the cam, which is desirable in burglar-proof locks, and at the same time it enables the tumbler-curb to be placed entirely inside of the cover of the lock, so that the curb cannot be reached except when the cover is removed; second, it causes the curb to be locked fast simply by putting the cover in place, because when that is done, the curb cannot be unscrewed; and, third, the method of carrying the tumblers on a detachable curb or bearing enables the tumblers to be removed from the lock in a body with the curb, and the combination of the tumblers to be more readily and conveniently changed, and reduces the liability to mistakes. Heretofore in locks of this class the tumblers have been put directly on a fixed stump attached to the case. In this construction, when it was desired to alter the combination, the tumblers had to be adjusted and replaced at the place where the lock was attached. This was often dark, contracted, and inconvenient—as a bank-vault, for example. In my improved construction the tumblers are not put directly on the fixed stump, but are carried on a detachable curb, which is screwed to the fixed stump. As, therefore, the tumblers are taken out in a body, the necessary adjustment for changing the combination is done away from the lock, and at any convenient place, so that the liability to error is reduced to a minimum, and then the tumblers are replaced in a body with the curb.

Figure 2:
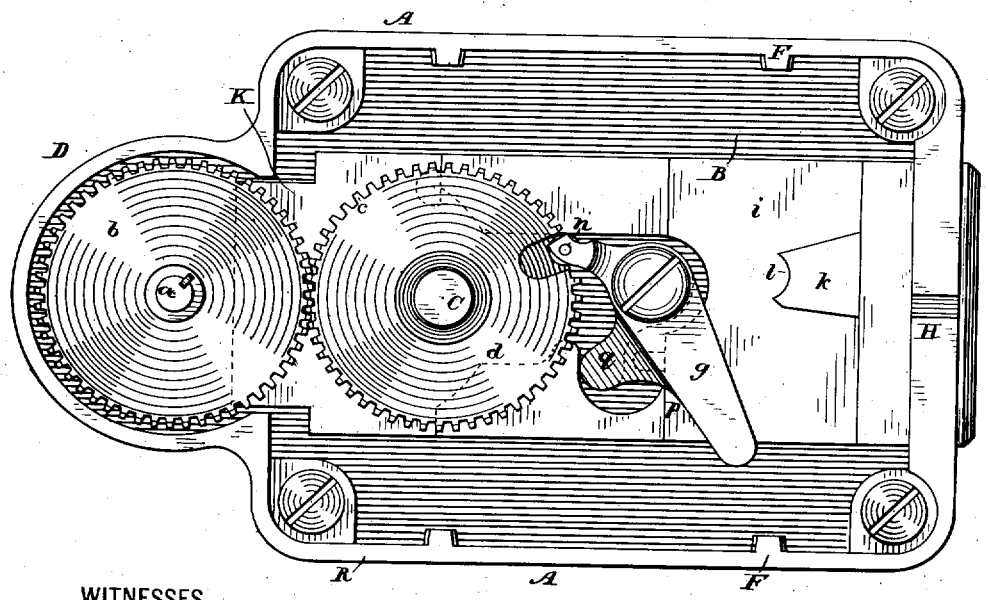
Figure 3:
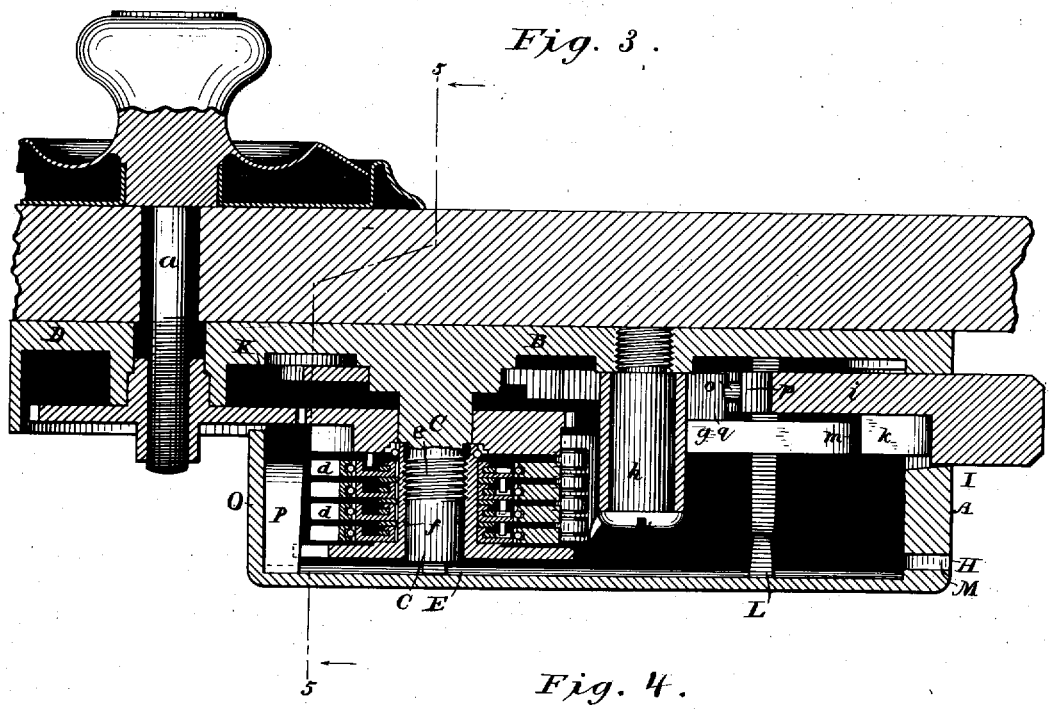
Figure 4:
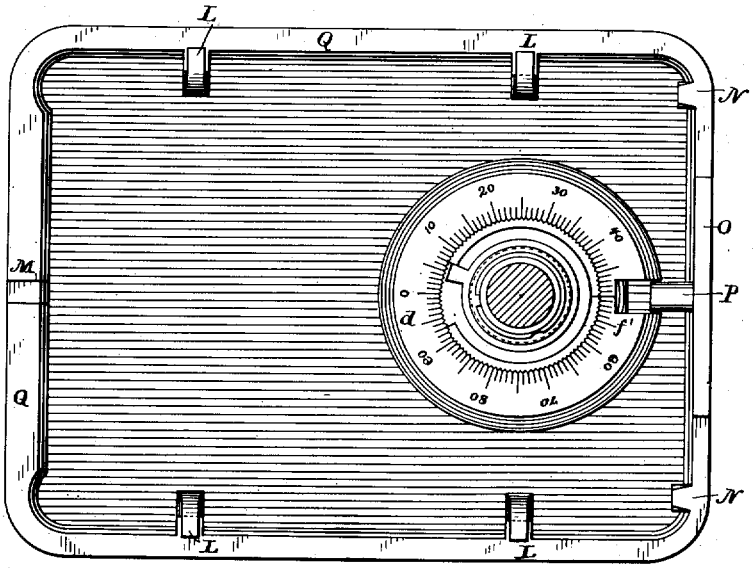
Figure 5:
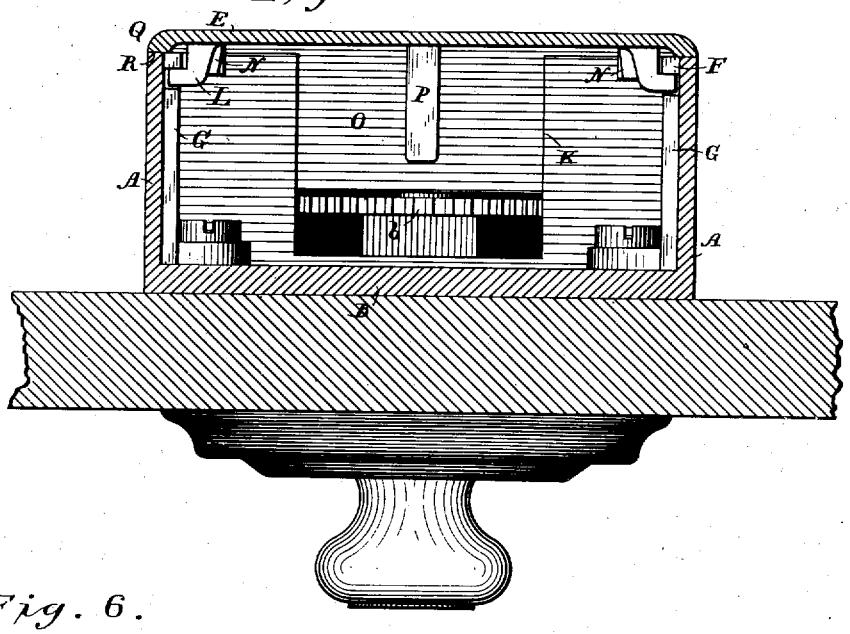
Figure 6:
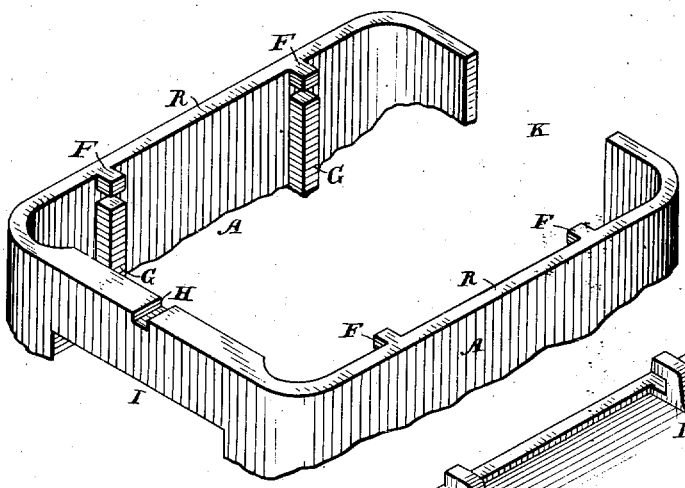
Figure 7:
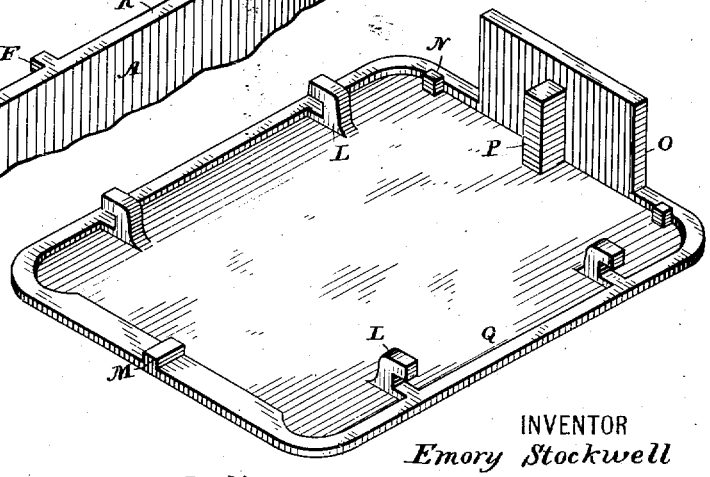

In the accompanying drawings, illustrating my improvements, Figure 1 is a front elevation of a lock with the back plate removed, showing the bolt and dog in the locked position. Fig. 2 is a similar elevation showing the bolt and dog in the unlocked position. Fig. 3 is a horizontal central section. Fig. 4 is a view of the inner face of the back plate of the lock, showing the relation of the plate to the tumblers and curb when the plate is in place. Fig. 5 is a sectional view on the line 5 5 of Fig. 3. Fig. 6 is a perspective view of a portion of the side walls of the lock-case; and Fig. 7 is a perspective view of the back plate of the lock-case, showing its inner face.

A indicates the side walls of the lock-case; B, the front of the case, provided with a fixed stump, C, for the tumbler curb and cam, and with an extension, D, at one end.

E indicates the back plate of the lock-case.

F indicates lugs projecting from the side walls of the case, preferably flush with their outer edge.

G indicates ribs immediately under the lugs F; but these ribs are not essential.

The side walls, lugs, and ribs may all be cast in one piece.

H indicates a groove or mortise in the edge of the side walls of the case, which may be of dovetailed shape, if desired.

I indicates an opening in one end of the side walls for the main bolt of the lock, and K indicates an opening in the opposite end.

Referring to the back plate, L indicates catches or angular projections cast on the inner face of the plate, coincident in position with the lugs F, and adapted to fit under them when the back plate is in place.

M indicates a lug or tenon, which may be of dovetail form, coincident in position with the mortise H, and adapted to fill it when the back plate is in place.

N N indicate stops upon the back plate, to limit its sliding movement when being adjusted to place.

O indicates a flange or plate, which is a part of the back plate, and adapted to fill the opening K in one end of the side walls of the lock-case.

P indicates a rib or fence upon this plate, adapted to enter the tumbler-notches when they are in coincidence, and to engage in the curb-notch *f'* and operate as a stop to prevent the curb from unscrewing, as indicated in Figs. 3 and 4.

To put the front plate in place, after the interior mechanism of the lock is in place and set to work upon a given combination, the tumblers are adjusted so that their notches coincide with the notch in the curb, substantially in the position indicated in Fig. 1, and also as shown in Fig. 4. The plate is then placed over the face of the lock, the rib P fitting into the notches. This will enable the plate to bear by its marginal surface Q flat upon the upper edge, R, of the side walls, and will bring the catches L and the tenon M opposite the mortise H, and the spaces underneath the lugs F. It will also bring the flange O opposite the opening K. The plate can now be slid along toward the spindle end of the case until the stops N N bear against the side wall of the case, when the plate will be in position. This will bring the rib P out of the tumbler-notches, but not entirely out of the curb-notch, and then the curb will be prevented from unscrewing by the rib P, and the turning of the spindle will bring one or more of the peripheries of the tumblers opposite the rib, and thus the back plate will be locked in position by the tumblers themselves, and it cannot be removed, so as to change the combination or get access to it from within, without setting the tumblers by means of the spindle upon a combination previously designated to bring their notches into coincidence opposite the rib P. Knowledge of such combination will of course only be in possession of the proper person.

*a* indicates the spindle of the lock; *b*, a gear-wheel secured to the spindle; *c*, the cam-wheel gearing with the wheel *b*; *d*, the tumblers, of ordinary construction; C, the fixed stump upon which the tumbler-curb *f* is fastened by a screw-connection, *e*; *g*, the fence and dog, composed of one piece and pivoted at *h*; *i*, the lock-bolt, and *k* a metallic lug or projection therefrom, with a concave face, *l*, fitting the convex end *m* of the dog.

*n* are slightly-eccentric anti-friction rollers provided for the fence, which project slightly beyond its surface next the tumblers, and bear normally against the peripheries of the tumblers.

*o* is a spring-bolt projecting out beyond a shoulder, *p*, in the lock-bolt, and bearing against a lug or downward projection, *q*, of the dog when it is in the locked position, and causing the anti-friction rollers to bear, by the force of the bolt-spring, against the peripheries of the tumblers. The lug *k* is in such relation to the adjacent end of the dog (as clearly illustrated in Fig. 1) that when force is applied to retract the bolt it acts as a cam against the rounded end of the dog to bear that end upward, retract the spring-bolt *o*, and withdraw the anti-friction rollers of the fence from contact with the peripheries of the tumblers. The result is that one attempting to pick the lock will not have the aid of the fence or its anti-friction rollers bearing against the peripheries of the tumblers under force applied to retract the main bolt. Consequently the picking of the lock by this method is rendered impossible.

So far as known, the fence provided with eccentric anti-friction rollers is an absolute protection against picking, so that even without the device above described the lock would be secure against this mode of attack; but the use of this device is an additional security against picking, and at the same time adapts the lock to receive end pressure against the bolt without danger that any part of its mechanism will be crushed or injured.

Many of the elements of my lock above described, and illustrated in the drawings, are not new in themselves, but are necessary to the operation and understanding of the organizations of my lock that are new, which new organizations are separately and distinctly stated in the following claims.

Having thus described my invention, what I claim to be new, and desire to secure by Letters Patent of the United States, is—

1. The combination, with the lock-case of a combination-lock, of a back plate and rotating notched tumblers of ordinary construction, the back plate being provided with a rib, P, or equivalent projection, whereby the tumblers serve normally to lock the plate in place, substantially as and for the purpose set forth.

2. The combination of a lock-case and the separable back plate provided with a fence or rib, P, and a tumbler-curb, all so constructed and arranged that when the plate is locked in position by the tumblers the fence will interlock with the curb and hold it in place, substantially as set forth.

3. The combination, with the tumblers, of the fence, the dog, the bolt, the lug for tilting the fence away from the tumblers, and the spring-bolt bearing against the dog, substantially as set forth.

4. In a side-shaft dial-lock, a removable tumbler-curb provided with a screw-threaded hub, in combination with a screw-threaded stump projecting from the case, substantially as described.

5. In a side-shaft dial-lock, the combination of a movable tumbler-curb provided with a screw-threaded hub, screw-threaded stump, and a projecting stop engaging with the curb to hold it against unscrewing, substantially as described.

In testimony whereof I have hereunto set my hand this 23d day of June, A. D. 1884.

EMORY STOCKWELL.

Witnesses:
SCHUYLER MERRITT,
GEO. E. WHITE.